United States Patent [19]
Crimmins et al.

[11] 3,826,329
[45] July 30, 1974

[54] AIR CUSHION APPARATUS

[75] Inventors: Arthur G. Crimmins; William J. Nissley, Jr., both of Wilmington, Del.

[73] Assignee: All American Industries, Inc., Wilmington, Del.

[22] Filed: May 8, 1972

[21] Appl. No.: 250,934

[52] U.S. Cl.............................. 180/125, 214/1 BE
[51] Int. Cl............................ B65g 7/06, B60v 1/00
[58] Field of Search........................... 180/116–130; 244/12; 137/525, 525.1, 525.7; 214/1 BE

[56] References Cited
UNITED STATES PATENTS

| | | | |
|---|---|---|---|
| 3,081,886 | 3/1963 | Flexman | 214/1 BE |
| 3,233,692 | 2/1966 | Guienne | 180/7 |
| 3,272,359 | 9/1966 | Thomas | 214/1 BE |
| 3,283,920 | 11/1966 | Schonfelder | 214/1 BE |
| 3,414,077 | 12/1968 | Earl | 180/128 |
| 3,739,407 | 6/1973 | Stiller | 180/125 X |

Primary Examiner—David Schonberg
Assistant Examiner—T. L. Siemens
Attorney, Agent, or Firm—Connolly and Hutz

[57] ABSTRACT

Air pressure is conserved in an air cushion load conveying apparatus by valve elements disposed within the air pressure chamber in operative association with an array of relatively small holes which provide the pressurized air cushion between the wall of the chamber and an adjacent surface. The valve elements are constructed and arranged to rapidly respond to the pressure differential across the holes. They quickly open and transmit chamber pressure to the pressurized air cushion when an object is disposed close to the hole and rapidly close and preserve pressure when there is no object and concomitant air cushion disposed adjacent the hole. The valve elements are flapper valves made of a single large perforated flexible sheet or a number of smaller sheets which substantially obstruct the holes in the presence of a high differential pressure. The flapper valves inherently leak, which makes them sensitively respond to changes in pressure. The leakage is, however, not enough to cause an undue loss of air through closed holes. Bleed holes may be provided, if necessary, to accelerate movement under special conditions. The perforated chamber wall may be rigid for operating against regular smooth surfaces or it may be flexible for operating against irregular or interrupted surfaces. A flexible walled chamber may be used under a rigid pallet for transporting a load over irregular surfaces. The upper surface of the rigid pallet may also be perforated and valved to facilitate sliding loads on and off, and the pressurized air may be alternately supplied to the upper and lower portions to facilitate loading, unloading and transport.

11 Claims, 11 Drawing Figures

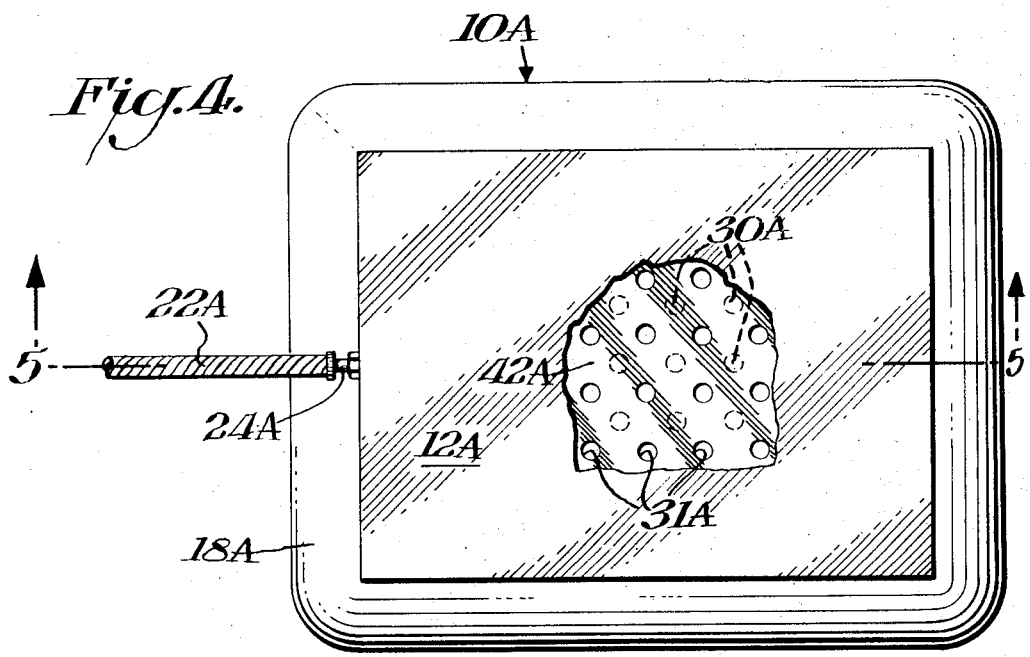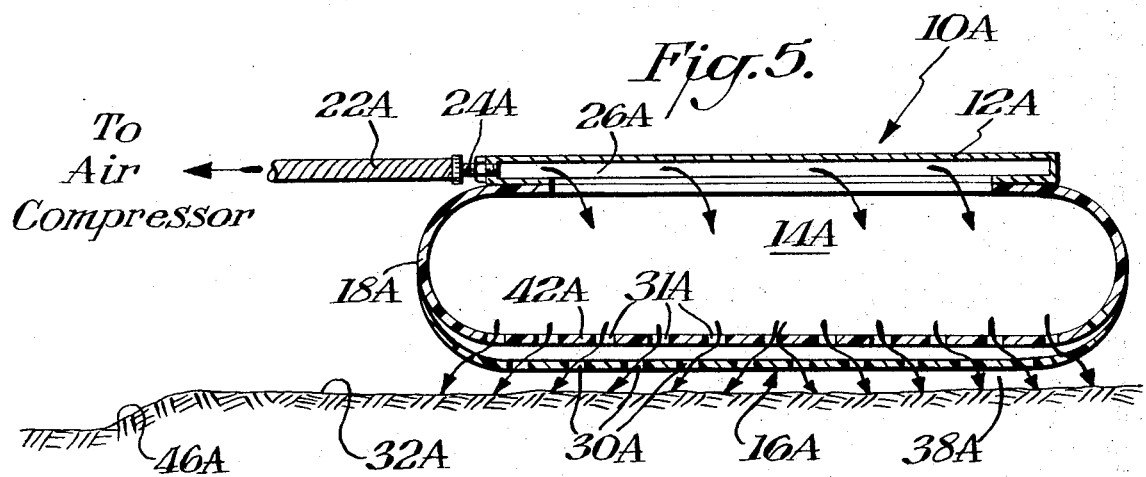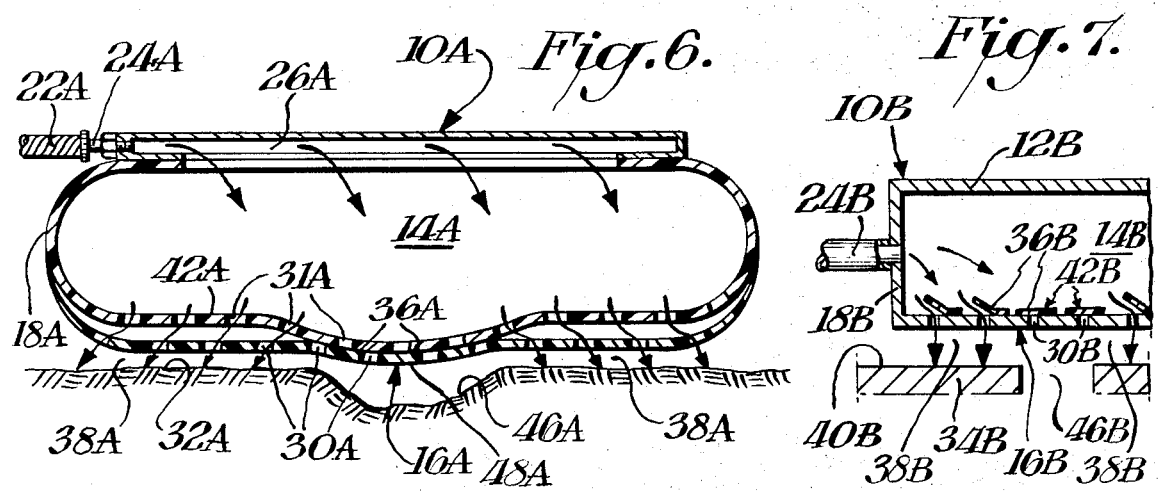

AIR CUSHION APPARATUS

BACKGROUND OF THE INVENTION

Air cushion devices are used for transporting loads over smooth flat surfaces, at a very low coefficient of friction, in conveyor tables, self-supporting pallets and in a variety of other air cushioned supports. Representative devices are described in U.S. Pat. No. 3,613,822 and in Jane's Surface Skimmer Systems, 1968–1969, Second Edition, Copyright 1968 by Jane's Surface Skimmer Systems Publishing Co., Ltd., pp. 110–117. See also Marks Mechanical Engineers Handbook, 7th Edition, pp. 11–72, 73. These air cushion devices are useful for conveying and transporting relative to flat smooth surfaces. Rougher or broken surfaces, destroy the air film, making it impossible to maintain an air cushion over brick, wood blocks, coarse macadam or broken surfaces including substantial holes or interruptions. An object of this invention is to provide an air cushion apparatus which operates efficiently in conjunction with a variety of rough, broken or interruped surfaces. Another object is to provide such an apparatus simply and economically.

SUMMARY

Air pressure is conserved in an air cushion load conveying apparatus by valve elements installed on an air pressure chamber in operative association with an array of relatively small holes which provide the pressurized air cushion between a wall of the chamber and an adjacent surface. The valve elements are constructed and arranged to rapidly respond to the pressure differential across the holes. They quickly open and transmit the chamber pressure to the pressurized air cushion when a surface is disposed close to the holes and rapidly close and preserve their pressure when there is no surface and concomitant air cushion disposed adjacent the hole. The valve elements may be flapper valves made of a single large perforated flexible sheet or a number of smaller sheets which substantially obstruct the holes in the presence of a high differential pressure. The flapper valves inherently leak which makes them sensitively respond to the changes in pressure. The leakage is, however, not enough to cause an undue loss of air through substantially closed holes. The perforated chamber wall may be rigid for operating against regular smooth surfaces or it may be flexible for operating against irregular or interrupted surfaces. A flexible walled chamber may be used under a rigid pallet for transporting a load over irregular surfaces, and the upper surface of a pallet may also be perforated to facilitate sliding loads on and off it. The pressurized air supply may be alternately supplied to the upper and lower portions to facilitate loading, unloading and transport.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 4 is a plan view partially broken away to show the interior of another embodiment of this invention;

FIG. 5 is a cross-sectional view taken through FIG. 4 along the line 5—5;

FIG. 6 is a cross-sectional view similar to FIG. 5 operating in conjunction with broken terrain;

FIG. 7 is a cross-sectional view in elevation of a still further embodiment of this invention being used for traversing a flat but broken surface;

DESCRIPTION OF THE PREFERRED EMBODIMENTS

Figure 1:
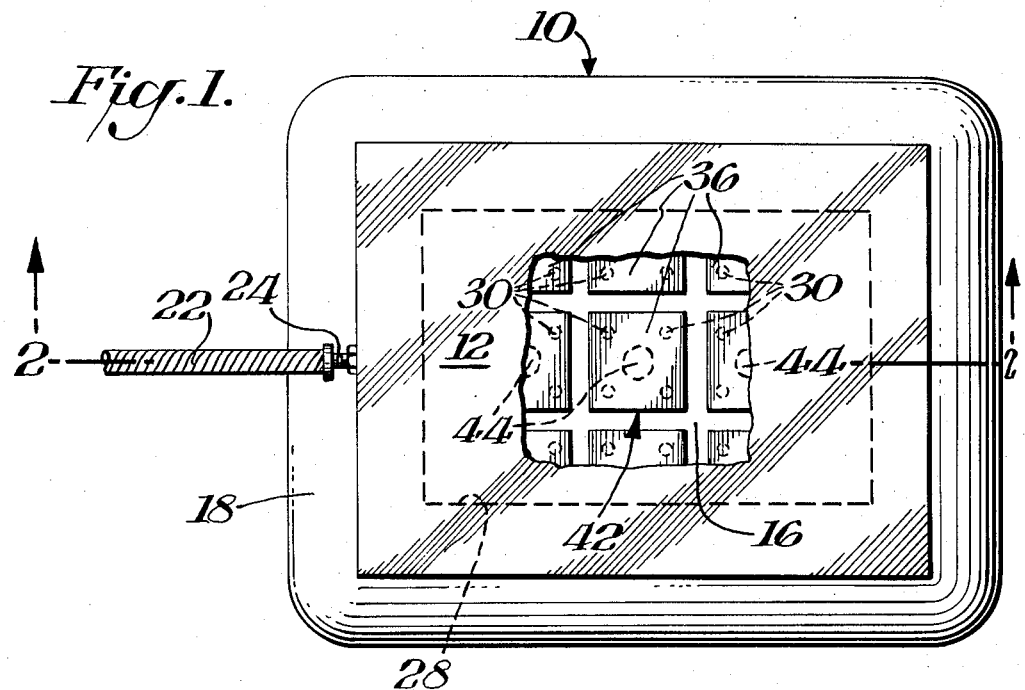
FIG. 1 is a plan view partially broken away to show the interior of one embodiment of this invention.
Figure 2:
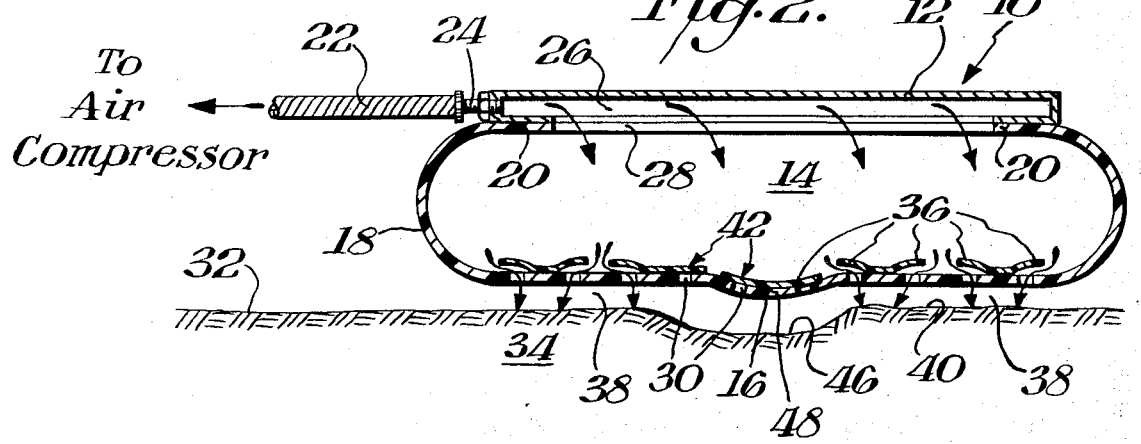
FIG. 2 is a cross-sectional view taken through FIG. 1 along the line 2—2.

In FIGS. 1 and 2 is shown an air cushion load transporting device 10 including a substantially rigid load supporting platform or pallet element 12 mounted upon a chamber 14 having a flexible bottom wall 16. Bottom wall 16 is continuous with flexible sidewall 18 having upper edges 20 connected below platform 12. A source of air pressure designated in FIG. 2 by legend "To Air Compressor" is connected to chamber 14 by hose or conduit 22 and coupling 24 secured to the side of pallet 12. Interior 26 of pallet 12 is hollow, and a large opening 28 connects hollow interior 26 with air chamber 14 to supply pressurized air to chamber 14.

Flexible bottom wall 16 includes an array of relatively small holes 30 for example about one-eighth inch in diameter, which are disposed in proximity to external surface 32 of ground 34. Pressurized air in chamber 14 communicates through open flapper valve elements 36, within chamber 14, to provide air cushions 38 between walls 16 and adjacent relatively flat areas 40 of ground 34. Holes 30 may be larger for larger devices, such as up to ¼ inch diameter for larger pallet sizes. Holes 30 should not, however, be large enough to catch or snag on projections or protrusions.

Flapper valves 36 are for example made of flexible sheets of material 42 secured for example by central glued areas 44 to wall 16 between four surrounding holes 30. Wall 16 is for example made of a relatively thick and wear-resistant material capable of confining air pressure, such as a coated strong synthetic woven fabric, for example nylon, dacron or a combination. Walls 16 and 18 also may be made of a strong urethane fabric. Laminated fabrics, such as combinations of lightweight nylon and vinyl films may also be used. Useful types of fabrics are for example those used for industrial outer covers on pallets or storage containers, or for industrial curtains, safety cloth machine covers pool covers, advertising banners, irrigation ditch liners and windbreaks. Sheets 42 which provide flaps 36 are more flexible and lighter in mass. They are for example provided by strong flexible materials, such as Mylar or other films or fabrics a few thousandths of an inch thick. Sheet materials making up walls 16 and 18 and internal sheets 42 may be of any composition and weight as long as they provide the functional characteristics described herein.

The portion of wall 16 in the center of FIG. 2 over depression 46 in ground 34 has slightly downward bulge 48 with flaps 36 being substantially closed to obstruct holes 30. Depression 46 prevents a perssurized air cushion from being maintained under the adjacent portion 48 of wall 16 and a lower pressure threfore exists under wall portion 48. This creates a higher differential pressure across holes 30 in portion 48 which moves flaps 36 into the closed positions over holes 30 to prevent an undue loss of pressure through them. The respective closed and open positions of flaps 36 over depression 46 and flat portion 40 of ground 34 are illustrated side by side in FIG. 3 with closed flaps 36 substantially obstructing holes 30 and open flaps 36 transmitting pressurized air from chamber 14 through holes 30 into pressurized air cushions 38 which support apparatus 10. The low mass of flaps 36 facilitates rapid opening and closure and therefore the retention of air pressure within chamber 14 when traversing rough or broken terrain. Flaps 36 only imperfectly seal holes 30 and a small amount of air leaks under them and out of holes 30 even in the closed condition. This unexpectedly facilitates rapid opening of flaps 36 instead of interfering with adjacent operation of valve elements 36 as would be logically anticipated. Flexible flaps 36 of relatively light and flimsy material therefore retain pressure within chamber 14 with remarkable efficiency in conjunction with wall 16 to which they are at attached. Relatively rough or broken ground including depressions 46 or even larger holes and gullys may be traversed by a loaded air cushion device 10.

Figure 3:
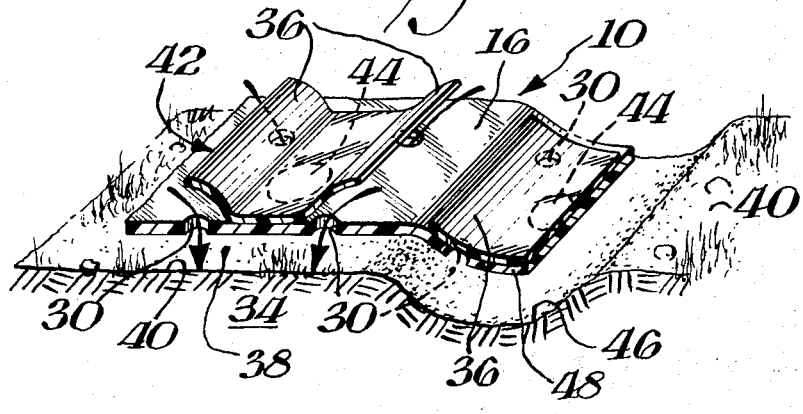
FIG. 3 is a fragmentary three-dimensional view of a portion of the lower surface of the embodiment shown in FIG. 2 in conjunction with a portion of the terrain being traversed.

In FIGS. 4–6 is shown an air cushion device 10A similar in most respects to device 10 shown in FIGS. 1–3 except that flap valves 36 are replaced by a perforated interliner 42A secured within side 18A. Perforated liner 42A includes an array of holes or perforations 31A misaligned with holes 30A in bottom wall 16A. Liner 42A therefore provides a function similar to flaps 36 but is not as independent in action because of its unitary construction. Liner 42A may be constructed of suitable elastic material so as to conform to the shape of bottom wall 16A as it moves across irregular surfaces. In any event liner 42A substantially contacts wall 16A in bulged area 48 of depression 46A to prevent undue loss of air pressure in chamber 14A in a similar manner to that described in conjunction with FIGS. 2 and 3. A slight leakage of air pressure also occurs between contacted portions of liner 42A and bottom wall 16A to facilitate the closure of valve elements 36A shown in FIG. 6.

FIG. 7 shows another air cushion apparatus 10B for traversing relatively flat areas such as smooth concrete floors 34B which might however include a gutter or other required indentation 46B. Bottom wall 16B and the other walls of apparatus 10B including sidewall 18B and top wall 12B are substantially rigid comprising a shallow box unit having internal air chamber 14B. Lower wall 16B may be substantially rigid because it need not conform to irregularities in adjacent surface 40B. Flapper valve elements 36B are similar to flappers 36 shown in FIGS. 2 and 3 with the exception that sheets 42B attached within wall 16B each cover only a single hole 30B as shown over gutter 46B. Such flat surfaces may also exist on a deck of a ship with spaces 46B occurring between the lips of the deck and elevator platforms. Loads are installed and carried on top wall 12B. Rigid device 10B is, for example, made of a strong molded plastic, such as polystyrene or an acrylic or a strong molded fiber board.

Figure 11:
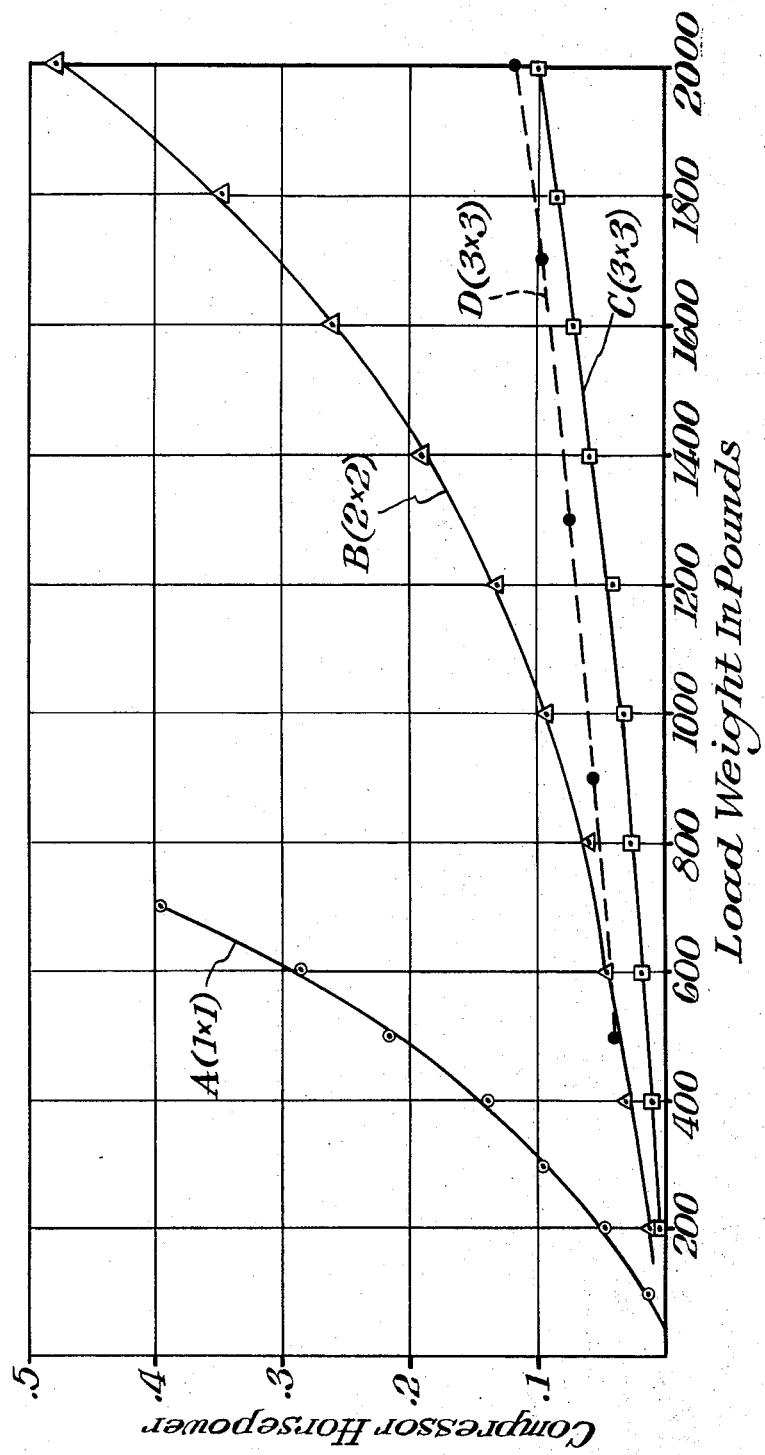
FIG. 11 is a graph of air compressor horsepower for supporting various loads on several embodiments of this invention.

Substantial loads may be carried on air cushion devices 10A–10B over rough, broken or irregular terrain. These devices also may have a flexible upper wall and comprise substantially flat bags as long as the applied loads can be safely carried on a flexible upper surface. The efficiency of the device however requires that the effective area creating the air cushion be above a predetermined minimum size because most of the leakage occurs around the circumference of periphery. An increase in area therefore provides a proportionately greater effective inner supporting area. Tests have been performed to determine the relationship between air cushion area, load supporting ability, required pressure, air quantity and horse power. The first three of these tests (A–C) were conducted with chambers having rigid top and sidewalls and only a flexible bottom wall of the full liner valved type shown in FIGS. 4–6. The last of the tests (D) was conducted in conjunction with a completely flexible bag also having a full liner valve element as shown in FIGS. 4–6. A comparison of the data obtained in these tests is included in the following table and illustrated in FIG. 11.

| Weight | PSI to Float | CFM to Float | HP = (PSI)(144)CFM / 33,000 |
|---|---|---|---|
| A. 1 Ft. × 1 Ft. Flex. Bottom | | | |
| 100 | 1.25 | 2.5 | .014 |
| 200 | 2.25 | 5.0 | .049 |
| 300 | 3.00 | 7.5 | .098 |
| 400 | 4.00 | 8.0 | .140 |
| 500 | 5.00 | 10.0 | .218 |
| 600 | 5.25 | 12.5 | .286 |
| 700 | 6.50 | 14.0 | .397 |
| B. 2 Ft. × 2 Ft. Flex. Bottom | | | |
| 200 | .50 | 5.00 | .012 |
| 400 | 1.10 | 6.50 | .031 |
| 600 | 1.50 | 7.50 | .049 |
| 800 | 1.80 | 8.00 | .063 |
| 1000 | 2.20 | 10.00 | .096 |
| 1200 | 2.50 | 12.50 | .136 |
| 1400 | 3.00 | 15.00 | .196 |
| 1600 | 3.25 | 18.50 | .262 |
| 1800 | 3.75 | 21.50 | .352 |
| 2000 | 4.25 | 26.00 | .482 |
| C. 3 Ft. × 3 Ft. Flex. Bottom | | | |
| 200 | .50 | 3.0 | .007 |
| 400 | .60 | 4.0 | .011 |
| 600 | .90 | 5.0 | .020 |
| 800 | 1.00 | 6.5 | .028 |
| 1000 | 1.10 | 7.5 | .036 |
| 1200 | 1.20 | 9.4 | .047 |
| 1400 | 1.40 | 10.0 | .061 |
| 1600 | 1.60 | 11.0 | .077 |
| 1800 | 1.70 | 12.0 | .089 |
| 2000 | 1.90 | 12.5 | .104 |
| D. 3 Ft. × 3 Ft. Bag | | | |
| 500 | 0.9 | 10.0 | 0.04 |
| 900 | 1.2 | 12.0 | 0.06 |
| 1300 | 1.4 | 13.0 | 0.08 |
| 1700 | 1.6 | 14.0 | 0.10 |
| 2000 | 1.8 | 15.0 | 0.12 |

These tests indicate that a square platform should be at least three feet by three feet to achieve a plateau of efficiency. A disabled aircraft might be moved by pumping up a series of air bags under its wings close to the fuselage. An air cushion bag at the bottom of each pile would provide an air cushion to move the aircraft slowly across the ground. It is estimated that no more than one-half horse power would be required per ton of aircraft to support its movement slowly across the ground. About 200 horse power would therefore be required for supporting an 800,000 lb. aircraft for movement slowly across semi-graded soil.

Figure 8:
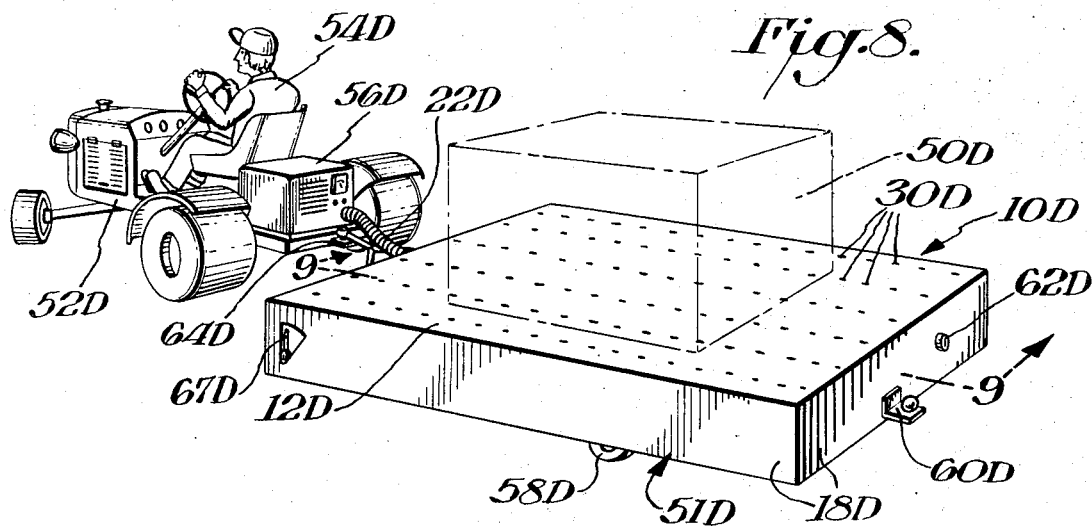
FIG. 8 is a three-dimensional view of a further embodiment of this invention in conjunction with a towing vehicle and load in phantom outline.
Figure 9:
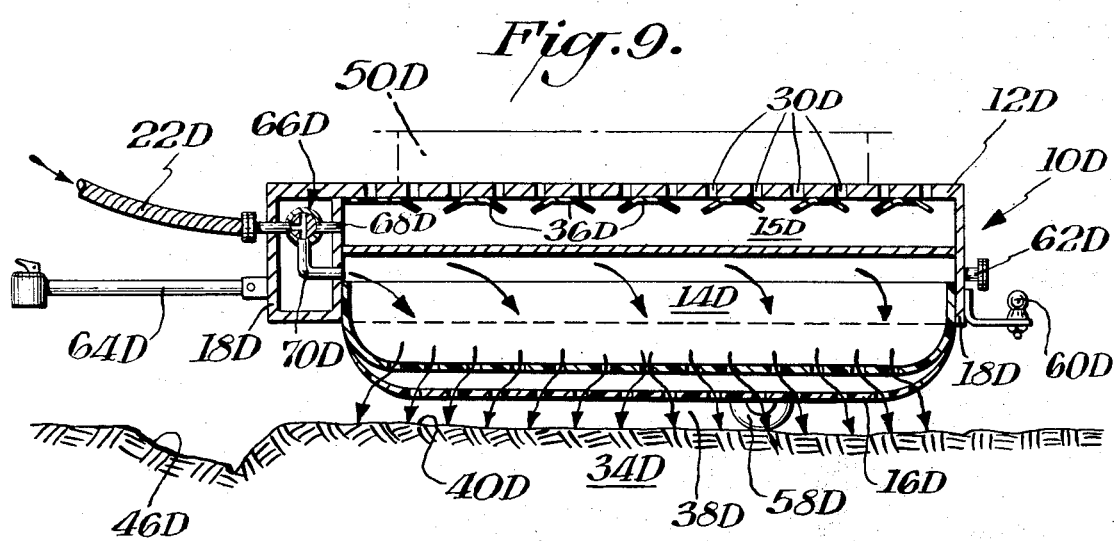
FIG. 9 is a cross-sectional view taken through FIG. 8 along the line 9—9.
Figure 10:
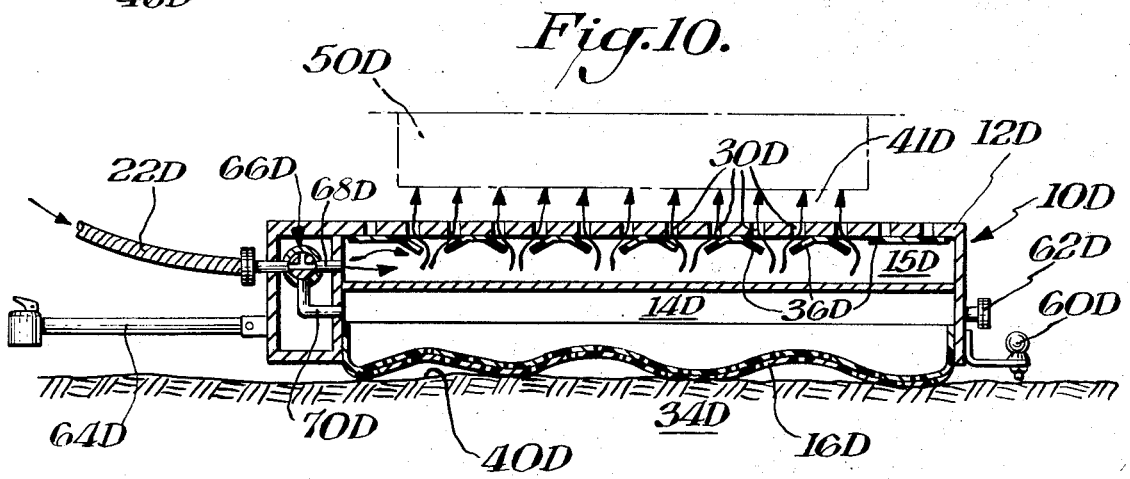
FIG. 10 is a cross-sectional view similar to FIG. 8 with an air cushion being directed to the upper load-carrying surface instead of the lower ground traversing surface.

In FIGS. 8-10 is shown a double-acting air cushion support device 10D which alternately utilizes an air cushion on its bottom wall 16D for moving across the ground 34D and upon its substantially rigid upper surface 12D for moving a load such as box 50D on and off it. Upper surface 12D is attached to substantially rigid sidewalls 18D thus forming a chassis 51D. Device 10D is for example towed by a vehicle 52D which carries operator 54D. Optional retractable wheels 58D are installed on chassis 51D to allow wheeled transportation of unloaded apparatus 10D. Wheels 58D are therefore spring biased to be retracted by normal loads imposed upon chassis 51D. A series of chassis 51D are connected together by hitch connection 60D and air coupling 62D at the rear of chassis 51D.

The front of chassis 51D is connected to vehicle 52D by tow bar 64D. Conduit or reinforced hose 22D connects air compressor 56D to valve 66D. Valve 66D is connected by pipe 68D to upper air chamber 15D and to lower air chamber 14D by pipe 70D. Valve 66D (operated by handle 67D) has two operating positions. One connects the air supply to lower chamber 14D as shown in FIG. 9 for transporting device or platform 10D over the ground, similarly to that described in conjunction with FIGS. 1-3. The same conditions occur as described in FIGS. 1-3 when apparatus 10D crosses depression 46D.

Valve 66D has a second position shown in FIG. 10 in which air pressure is connected to upper chamber 15D and disconnected from lower chamber 14D. This collapses chamber 14D to drop apparatus 10D on the ground. In the position illustrated in FIG. 10, pressurized air is being provided to an air cushion 41D above substantially rigid top wall 12D which is, for example, made of perforated plywood including a number of holes 30D. Air cushion 41D is limited to the areas opposite holes 30D adjacent the bottom of box 50D: and it thus provides a thin film of air or cushion between the bottom of box 50D and top wall 12D, which facilitates sliding box 50D on and off chassis 51D. As shown in the right-hand portion of top surface 12, uncovered holes 30D are substantially sealed by adjacent flaps 36D in response to the differential pressure within chamber 15D relative to the lower atmospheric pressure above holes 30D. Pressure is therefore retained in chamber 15D in the absence of a surface blocking holes 30D and its concomitant pressurized air cushion.

Valve 66D also has a fully shutoff position to facilitate disconnection of a chassis 51D. Air cushion may accordingly be applied to either the top or bottom surface of apparatus 10D in the most advantageous manner to traverse the ground and retain a load in position, to facilitate loading and unloading cargo when device 10D is stationary and to facilitate connection and disconnection of a train of several apparatus 10D.

We claim:
1. An air cushion support apparatus comprising a chamber having a wall of substantial area, a source of air pressure, a conduit connecting said chamber to said source of air pressure to provide a differential of higher pressure in said chamber above atmospheric pressure, an array of relatively small holes in said wall for communicating air pressure from said chamber between said wall and an adjacent external surface whereby a pressurized air cushion is provided between said wall and said adjacent external surface, valve elements disposed within said chamber adjacent said holes, said valve elements being movable for movement from open positions away from said adjacent holes to closed positions in which they substantially obstruct said holes, said valve elements being constructed and arranged as flapper valve elements comprising a thin flexible sheet a few thousandths of an inch thick disposed within said chamber, a free portion of said sheet being large enough and disposable to substantially cover and substantially close over at least one of said holes to rapidly respond to the pressure differential across said holes whereby they open to transmit said chamber pressure to said pressurized air cushion and close to prevent loss of said air pressure when no external surface and air cushion are disposed adjacent the hole with which said valve elements is operatively associated and which slightly leak in the closed position whereby rapid opening is facilitated.

2. An apparatus as set forth in claim 1 wherein a number of said flexible sheets are disposed within said chamber.

3. An apparatus as set forth in claim 2 wherein each of said flexible sheets of material is attached to the wall of said chamber.

4. An apparatus as set forth in claim 3 wherein a portion of each of said flexible sheets is disposed in the path of air flow through several of said holes, and each of said sheets is attached to said wall between said several holes.

5. An apparatus as set forth in claim 1 wherein said valve elements comprise a perforated flexible sheet mounted within said chamber adjacent said wall and the perforations in said sheet being out of line with said holes.

6. An apparatus as set forth in claim 1 wherein a substantially rigid pallet element is mounted upon said chamber, said conduit being connected to said pallet element, and a passageway from said pallet element connected to said chamber for communicating said air pressure to said chamber.

7. An apparatus as set forth in claim 3 wherein a number of said flexible sheets are disposed within said chamber and each of said flexible sheets of material is attached to the wall of said chamber.

8. An apparatus as set forth in claim 4 wherein a portion of each of said flexible sheets is disposed in the path of air flow through several of said holes, and each of said sheets is attached to said wall between said several holes.

9. An apparatus as set forth in claim 1 wherein said chamber has a substantially rigid wall, and said valve elements comprise flapper valves operatively associated with each of said holes.

10. An apparatus as set forth in claim 9 wherein a number of said flexible sheets are disposed within said chamber, each of said flexible sheets being attached to said wall, a portion of each of said flexible sheets being disposed in the path of air flow through several of said holes, and each of said sheets being attached to said wall between said several holes.

11. An apparatus as set forth in claim 9 wherein one of said flexible sheets is operatively associated with one of said holes.

* * * * *